(12) United States Patent
Takeuchi et al.

(10) Patent No.: US 8,232,339 B2
(45) Date of Patent: *Jul. 31, 2012

(54) PRODUCTION OF MOLDED FIBROUS BASIC MAGNESIUM SULFATE FILLER-CONTAINING OLEFIN POLYMER COMPOSITION PRODUCTS

(75) Inventors: Atsushi Takeuchi, Saitama (JP); Shinichi Yamamoto, Yamaguchi (JP); Takashi Kishimoto, Yamaguchi (JP)

(73) Assignees: Honda Motor Co., Ltd., Minato-ku, Tokyo (JP); Ube Material Industries, Ltd., Ube-shi, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,984

(22) Filed: Mar. 14, 2011

(65) Prior Publication Data

US 2011/0230608 A1    Sep. 22, 2011

(30) Foreign Application Priority Data

Mar. 16, 2010   (JP) .................................. 2010-059259

(51) Int. Cl.
*C08K 3/30*   (2006.01)

(52) U.S. Cl. .......................................... 524/423; 523/351
(58) Field of Classification Search .................. 523/351; 524/423
See application file for complete search history.

(56) References Cited

U.S. PATENT DOCUMENTS

| | | | |
|---|---|---|---|
| 5,807,519 A * | 9/1998 | Suzuki et al. | 264/401 |
| 2011/0077336 A1 * | 3/2011 | Takeuchi et al. | 524/315 |

FOREIGN PATENT DOCUMENTS

JP  2006-083369  3/2006

* cited by examiner

*Primary Examiner* — Peter Szekely
(74) *Attorney, Agent, or Firm* — Nixon Peabody LLP; Jeffrey L. Costellia

(57) ABSTRACT

A molded fibrous basic magnesium sulfate filler-containing olefin polymer composition product is produced by a process comprising the steps of preparing a fibrous basic magnesium sulfate tiller-containing master batch composition which comprises an olefin polymer, a fibrous basic magnesium sulfate filler, an elastomer, a specific lubricant and a specific filler-surface treating agent; mixing the master batch composition and a propylene polymer-containing diluent resin; kneading the resulting mixture in a molten state; and molding the molten mixture to give the molded product.

11 Claims, No Drawings

PRODUCTION OF MOLDED FIBROUS BASIC MAGNESIUM SULFATE FILLER-CONTAINING OLEFIN POLYMER COMPOSITION PRODUCTS

FIELD OF THE INVENTION

The present invention relates to a process for producing a molded fibrous basic magnesium sulfate filler-containing olefin polymer composition product. The invention further relates to a fibrous basic magnesium sulfate filler-containing master batch composition favorably employable for performing the process of the invention.

BACKGROUND OF THE INVENTION

Propylene polymers are thermoplastic and hence can be melted by heating and molded to give articles having various shapes. Therefore, the propylene polymers are widely employed, for instance, for producing sheathing parts of automobiles, housings of household electric appliances such as refrigerators and washing machines, and other various molded products such as trays, shelf plates and wrapping films. It is known that the propylene polymers are mixed with additives such as inorganic fillers, lubricants and elastomers so as to improve rigidity and impact strength of the molded products. As the inorganic fillers, there are known fibrous inorganic fillers such as a fibrous basic magnesium sulfate filler and non-fibrous fillers such as talc. Basic magnesium sulfate has the chemical formula of $MgSO_4 \cdot 5Mg(OH)_2 \cdot 3H_2O$.

JP 2006-83369A (corresponding to U.S. 2006/0052544A1) describes a method for producing a propylene-based resin composition comprising a first step of producing a first resin composition (MB) by melt-kneading a first-propylene polymer (A-I) and a fibrous inorganic filler (B) in a weight ratio of (A-I) to (B) of from 3/7 to 7/3; and a second step of producing a second resin composition by adding a second propylene polymer (A-II), a non-fibrous inorganic filler (C) and an elastomer (D) selected from the group consisting of olefin-based elastomer and vinyl aromatic compound-containing elastomer to the first resin composition (MB), followed by melt kneading them. In the working examples, the first resin composition (i.e., master batch composition) contains a lubricant.

There are cases in which molded products made from an olefin polymer composition are desired to show further increased impact strength. For instance, bumpers and other sheathing parts of automobiles for driving at low temperatures are desired to show high impact strengths such as high izod impact strength and surface impact strength at low temperatures such as lower than 0° C., keeping the high modulus in flexure.

SUMMARY OF THE INVENTION

Accordingly, it is an object of the invention to provide a process for producing an olefin polymer composition product showing high izod impact strength and surface impact strength at low temperatures such as lower than 0° C., keeping the high modulus in flexure.

The present inventors have found that molded products produced from an olefin polymer composition show favorably high izod impact strength and surface impact strength at low temperatures, keeping the high modulus in flexure, if the molded product is produced using a master batch olefin composition comprising an elastomer, a specific lubricant and a specific filler-surface treating agent in addition to the olefin polymer and fibrous basic magnesium sulfate filler.

From one aspect, the present invention provides a process for producing a molded fibrous basic magnesium sulfate filler-containing olefin polymer composition product which comprises the steps of:

preparing a fibrous basic magnesium sulfate filler-containing master batch composition which comprises the following components:

(A) an olefin polymer,
(B) a fibrous basic magnesium sulfate filler,
(C) an elastomer,
(D) a lubricant selected from the group consisting of a hydrocarbon, a halogenated hydrocarbon, a fatty acid amide, an alkylenebis(fatty acid amide), a fatty acid ester, a monohydric alcohol having 16 or more carbon atoms, a polyhydric alcohol, and a fatty acid salt of magnesium or a metal having an ionization tendency lower than that of magnesium, and
(E) a filler-surface treating agent selected from the group consisting of a fatty acid, an oxyfatty acid, an aliphatic alcohol phosphate and a coupling agent;

mixing 100 weight parts of the fibrous basic magnesium sulfate-containing master batch composition and 100 to 2,000 weight parts of a diluent resin containing a propylene polymer, to give a mixture;

kneading the resulting mixture in a molten state, to give a molten mixture; and molding the molten mixture to give the molded product.

From another aspect, the invention provides the above-mentioned fibrous basic magnesium sulfate filler-containing master batch composition.

EMBODIMENTS OF THE INVENTION

The preferred embodiments of the process and master batch composition of the invention are described below.

1. The master batch composition comprises the component (A) in an amount of 1 to 45 weight parts, the component (B) in an amount of 35 to 80 weight parts, and the component (C) in an amount of 5 to 45 weight parts under the condition that the total amount of the components (A), (B) and (C) is 100 weight parts, and the component (D) in an amount of 0.01 to 10.0 weight parts and the component (E) in an amount of 0.01 to 15.0 weight parts under the condition that the amount of the component my is in the range of 0.02 to 15.0 weight parts and the amount of the component (E) is in the range of 0.02 to 20.0 weight parts, per 100 weight parts of the component (B).

2. The component is at least one olefin polymer selected from the group consisting of a propylene polymer, an ethylene polymer, and an ethylene-propylene copolymer.

3. The component (B) is a fibrous basic magnesium sulfate has a thickness in the range of 0.1 to 1.0 µm and an average aspect ratio of 5 or more. 4. The component (C) is at least one elastomer selected from the group consisting of an ethylene-butene elastomer, an ethylene-octene elastomer and a styrenic unit-containing elastomer.

5. In the master batch composition, the component (A) is contained in an amount of 1 to 45 weight parts, particularly in an amount of 1 to 20 weight parts, per the total amount (100 weight parts) of the components (A), (B) and (C).

6. In the master batch composition, the component (B) is contained in an amount of 35 to 80 weight parts, particularly in an amount of 50 to 80 weight parts, per the total amount (100 weight parts) of the components (A), (B) and (C).

7. In the master batch composition, the component (C) is contained in an amount of 5 to 45 weight parts, particularly in an amount of 10 to 40 weight parts, per the total amount (100 weight parts) of the components (A), (B) and (C).

8. In the master batch composition, the component (D) is contained in an amount of 0.01 to 10.0 weight parts, particularly in an amount of 0.1 to 5.0 weight parts, per the total amount (100 weight parts) of the components (A), (B) and (C), and in an amount of 0.02 to 15.0 weight parts, particularly in an amount of 0.2 to 5.0 weight parts, per the amount (100 weight parts) of the component (B).

9. In the master batch composition, the component (E) is contained in an amount of 0.01 to 15.0 weight parts, particularly in an amount of 0.03 to 10.0 weight parts, per the total amount (100 weight parts) of the components (A), (B) and (C), and in an amount of 0.02 to 20.0 weight parts, particularly in an amount of 0.06 to 15.0 weight parts, per the amount (100 weight parts) of the component (B).

The components (A), (B), (C), (D), and (E) are further described below.

(A) Olefin Polymer

The olefin polymer preferably shows a melt flow index (MFR) in the range of 3 to 300 g/10 min., determined by the method described in ASTM-D1238 at a temperature of 230° C. and a load of 2.16 kg. Examples of the olefin polymer include ethylene polymers, propylene polymers and ethylene-propylene copolymers. The propylene polymer can be an inherently crystalline propylene homo-polymer or an inherently crystalline propylene-1-olefin copolymer comprising not less than 50 mol. % of propylene unit. The olefin polymers can be employed singly or in combination.

(B) Fibrous Basic Magnesium Sulfate Filler

The fibrous basic magnesium sulfate filler preferably has a mean thickness in the range of 0.1 to 1.0 μm and a mean aspect ratio (mean length/mean thickness) of not less than 5, particularly in the range of 5 to 50. The mean length and mean thickness can be determined from an enlarged SEM (Scanning Electron microscope) image. The fibrous basic magnesium sulfate filler may be in the form of aggregated mass or coagulated mass.

(C) Elastomer

Examples of the elastomer include an ethylene-α-olefin elastomer and a styrenic elastomer, that is, a styrenic unit-containing elastomer. The elastomer can be employed singly or in combination.

The ethylene-α-olefin elastomer can be a copolymer of ethylene and α-olefin and a copolymer of ethylene, α-olefin and non-conjugated diene. Examples of the α-olefin include 1-butene, 1-pentene, 1-hexene, 1-heptene and 1-octene. Examples of the non-conjugated diene include dicyclopentadiene, 1,4-hexadiene, cyclooctadiene, di-cyclooctadiene, methylenenorbornene, 5-ethylidene-2-norbornene, 5-vinyl-2-norbornene, 5-methylene-2-norbornene, 5-methyl-1,4-hexadiene and 7-methyl-1,6-octadiene.

Examples of the ethylene-α-olefin elastomer include ethylene-propylene rubber (EPR), ethylene-1-butene rubber (EBR), ethylene-1-octene rubber (EOR), ethylene-propylene-nonconjugated diene elastomer (EPDM), ethylene-propylene-1-butene rubber (EPBR), elastic ethylene-1-butene-nonconjugated copolymer (EBDM) and ethylene-propylene-1-butene-nonconjugated diene elastomer (EPBDM). Preferred are ethylene-butene elastomers comprising ethylene and 1-butene and ethylene-octene elastomers comprising ethylene and 1-octene.

The ethylene-α-olefin elastomer generally shows a melt flow rate (MFR determined by the method described in ASTM-D1238, temperature: 190° C., load: 2.16 kg) of not less than 0.1 g/10 min., preferably in the range of 0.3 to 20 g/10 min.

The styrenic elastomer can be a block copolymer comprising styrenic compound polymer blocks and conjugated diene polymer blocks or a hydrogenated block copolymer having the conjugated diene unit whose the double bond is hydrogenated.

Examples of the styrenic elastomer include block copolymers such as styrene-butadiene rubber (SBR), styrene-butadiene-styrene block copolymer elastomer (SBS), styrene-isoprene-styrene block copolymer elastomer (SIS) and styrene-ethylene-propylene-styrene copolymer elastomer (SEPS) and their hydrogenated block copolymers.

The styrenic elastomer generally shows a melt flow rate (MFR determined by the method described in ASTM-D1238, temperature: 230° C., load: 2.16 kg) of not less than 0.1 g/10 min., preferably in the range of 0.1 to 100 g/10 min., more preferably in the range of 0.5 to 20 g/10 min.

Particularly preferred are EBR, EOR and SEES.

(D) Lubricant

The lubricant preferably shows affinity to the fibrous basic magnesium sulfate filler. Therefore, it is preferred that the lubricant is selected from the group consisting of a hydrocarbon, a halogenated hydrocarbon, a fatty acid amide, an alkylenebis(fatty acid amide), a fatty acid ester, a monohydric alcohol having 16 or more carbon atoms, a polyhydric alcohol, and a fatty salt of magnesium or a metal having a ionization tendency lower than that of magnesium. The lubricant can be employed singly or in combination. Particularly preferred are the fatty acid amide, alkylenebis(fatty acid amide) and fatty acid metal salt (including magnesium salt). The most preferred is a fatty acid magnesium salt.

Examples of the hydrocarbon include liquid paraffin, natural paraffin, synthetic paraffin, microcrystalline wax and polyethylene wax.

Examples of the halogenated hydrocarbon include chlorinated naphthalene.

The fatty acid amide can be a saturated fatty acid amide or an unsaturated fatty acid amide. Examples of the fatty acid amide include stearyl amide, palmityl amide, oleyl amide, and erucic acid amide.

Examples of the alkylenebis(fatty acid amide) include methylenebis(stearoamide) and ethylenebis(stearoamide).

The fatty acid ester can be a monohydric alcohol ester of a fatty acid, a polyhydric alcohol ester of a fatty acid and a polyglycol ester of a fatty acid. The fatty acid can be a saturated fatty acid or an unsaturated fatty acid. Examples of the alcohol ester include butyl stearate, stearyl stearate, polyethylene glycol monostearate and hardened caster oil.

The monohydric alcohol having 16 or more carbon atoms can be cetyl alcohol or stearyl alcohol.

The polyhydric alcohol can be ethylene glycol, propylene glycol, polyglycol, glycerol, polyglycerol, erythritol, pentaerythritol, arabitol, sorbitol, sorbitan, or mannitol.

The fatty acid for the fatty acid salt of magnesium or a metal having a ionization tendency lower than that of magnesium preferably has 12 to 22 carbon atoms. The fatty acid can be a saturated fatty acid or an unsaturated fatty acid. Examples of the metal having an ionization tendency lower than that of magnesium include zinc, copper, lead, aluminum, iron, cobalt, chromium and manganese. The fatty acid magnesium salt is most preferred.

(E) Filler-surface Treating Agent

The filler-surface treating agent preferably is a fatty acid, an oxyfatty acid, a phosphate of an aliphatic alcohol, and a coupling agent. The filler-surface treating agent can be employed singly or in combination.

Preferred are the fatty acid, phosphate of an aliphatic alcohol and coupling agent. The fatty acid can be in the form of a salt with a metal having an ionization tendency higher than that of magnesium (e.g., lithium, potassium, sodium, and calcium).

The fatty acid preferably has 12 to 22 carbon atoms. The fatty acid can be a saturated fatty acid or an unsaturated fatty acid. Examples of the saturated fatty acid include lauric acid, tridecyl acid, myristic acid, pentadecyl acid, palmitic acid, margaric acid (i.e., heptadecyl acid), stearic acid, nonadecyl acid, arachidic acid, and behenic acid. Examples of the unsaturated fatty acid include myristoleic acid, palmitoleic acid, oleic acid, eraidic acid, vaccenic acid (i.e., trans-11-octadecenic acid), gadoleic acid (i.e., 9-eicosenoic acid), and ercic acid (i.e., cis-13-docosenoic acid.

The oxyfatty acid preferably has 12 to 22 carbon atoms. the oxyfatty acid can be an oxy-saturated fatty acid or an oxy-unsaturated fatty acid.

The phosphate of an aliphatic alcohol preferably is an alkyl phosphate or a dialkyl phosphate. Examples of the phosphate of an aliphatic alcohol include stearyl phosphate and distearyl phosphate.

The coupling agent can be a silane coupling agent, a titanate coupling agent, an aluminum coupling agent, and a zirconate coupling agent. The silane coupling agent and titanate coupling agent are preferred.

The procedures involved in the process for producing a molded fibrous basic magnesium sulfate filler-containing olefin polymer composition product are described below in more detail.

The master batch composition preferably is in the form of pellets, particularly cylindrical pellets. The cylindrical pellets preferably have a diameter in the range of 1 to 5 mm and a length in the range of 1 to 5 mm. It is preferred that 50 pellets have a weight of 0.5 to 5.0 g.

In the process of the invention, the master batch composition is mixed with a diluent resin containing a propylene polymer (mixing ratio: 100 to 100-2,000, by weight), to give a mixture. The resulting mixture is kneaded in a molten state and molded to give a molded product according to the conventionally known procedures. The mixing and kneading in the above-mentioned procedure can be simultaneously performed.

It is the inventors' understanding that the fibrous basic magnesium sulfate filler is dispersed in the master batch composition in the form of pellets according to the invention under highly uniform state probably due to the incorporation of the additional three components including (C) an elastomer, (D) a lubricant and (E) a filler-surface treating agent. Therefore, when the master batch pellets are mixed with a diluent resin and kneaded under heating, the fibrous basic magnesium sulfate filler having been dispersed in the master batch pellets is smoothly and rapidly dispersed in the kneaded mixture. For this reason, the molded product produced from the kneaded mixture using the master batch pellets shows increased impact strengths.

The diluent resin can comprises essentially a propylene polymer alone or can comprise a propylene polymer and a relatively small amount of one or more of other thermoplastic polymers such as other olefin polymers. The diluent resin can contain a non-fibrous inorganic filler and/or an elastomer in addition to the polymeric material. For instance, when the outer parts of automobiles such as a bumper are produced, the diluent resin preferably is in the form of a composition comprising a propylene polymer (30 to 80 wt. %), a non-fibrous inorganic filler (5 to 40 wt. %), and an elastomer (5 to 60 wt. %)

In the above-mentioned diluent resin composition, the non-fibrous inorganic filler can be talc, mica, calcium carbonate, barium sulfate, magnesium carbonate, clay, alumina, silica, calcium sulfate, magnesium hydroxide, dolomite, glass flakes, glass balloons, glass beads, calcium silicate, smectites, montmorillonite, bentonite, kaolinite, carbon black, or titanium dioxide. Preferred is talc. The non-fibrous inorganic filler preferably has a mean size in the range of 0.1 to 10 µm, more preferably in the range of 0.1 to 5 µm. The mean size of the filler can be determined by a laser diffraction method.

The elastomer employable as a component of the diluent resin composition can be the same as the elastomer which is described hereinbefore as the component of the master batch composition. However, the elastomer in the diluent resin composition can be the same as or different from the elastomer contained in the master batch composition.

If desired, the diluent resin composition can contain other additives such as an oxidation inhibitor, a UV absorber, a pigment, an anti static agent, a copper inactivating agent, a flame retardant, other lubricants, a neutralizing agent, a forming agent, a plasticizer, an anti-forming agent, and a cross-linking agent.

The molding can be performed by the known procedures such as injection molding, extrusion molding, calendering, blow molding, foam molding, and centrifugal molding.

The finally produced molded product preferably contains the fibrous basic magnesium sulfate filler in an amount of 2 to 15 wt. %.

The invention is further described by the following non-limiting examples.

EXAMPLE 1

(1) Production of Master Batch Pellets

Ten (10) weight parts of a propylene polymer (MFR determined at 230° C. and 2.16 kg: 49.4 g/10 min.), 70 weight parts of a fibrous basic magnesium sulfate filler (mean length: 15 µm, mean thickness: 0.5 µm), 20 weight parts of an elastic styrene-ethylene-propylene-styrene block copolymer (SEPS, MFR determined at 230° C. and 2.16 kg: 5.0 g/10 min.), 1.47 weight parts of magnesium stearate, and 0.14 weight part of stearic acid were placed in a tumbler and dry-blended. The blended mixture was then kneaded in a double-screw kneader at 200° C. and subsequently extruded in the form of strands having a diameter of 3 mm. The strands were intermittently cut to give master batch pellets having a length of 3 mm.

(2) Production of Diluent Resin Pellets

Sixty two (62) weight parts of a propylene polymer (MFR determined at 230° C. and 2.16 kg: 50.0 g/10 min.), 30 weight parts of an elastic ethylene-1-butene copolymer (EBR, MFR determined at 190° C. and 2.16 kg: 5.0 g/10 min.), 8 weight parts of talc (mean size: 4.7 µm), and 0.1 weight part of calcium stearate were placed in a tumbler and dry-blended. The blended mixture was then kneaded in a double-screw kneader at 200° C. and subsequently extruded in the form of strands having a diameter of 3 mm. The strands were intermittently cut to give diluent resin pellets having a length of 3 mm.

(3) Production of Propylene Resin Composition Molded Product

The master batch pellets (7.4 weight pants) produced in (1) above and the diluent resin pellets (92.6 weight parts) produced in (2) above were mixed and placed in an injection molding machine (heated to 200° C.) to produce test pieces of the propylene resin composition molded product.

EXAMPLES 2 AND 3

The procedures of Example 1 were repeated except for employing master batch pellets produced using stearic acid in an amount of 0.70 weight part (for Example 2) or 2.10 weight parts (for Example 3), to produce test pieces of the propylene resin composition molded product.

EXAMPLE 4

The procedures of Example 1 were repeated except for employing master batch pellets produced using 0.70 weight part of oleic acid in place of stearic acid, to produce test pieces of the propylene resin composition molded product.

EXAMPLE 5

The procedures of Example 1 were repeated except for employing master batch pellets produced using 0.70 weight part of an aliphatic alcohol phosphonate (ADEKA TAB AX-71, available from ADEKA Co., Ltd.) in place of stearic acid, to produce test pieces of the propylene resin composition molded product.

EXAMPLES 6 TO 9

The procedures of Example 1 were repeated except for employing master batch pellets produced using 0.07 weight part (for Example 6), 0.70 weight part (for Example 7), 3.00 weight parts (for Example 8), or 7.00 weight parts (for Example 9) of a titanate coupling agent (KR44, available from Ajinomoto Fine-Techno, Co., Inc.) in place of stearic acid, to produce test pieces of the propylene resin composition molded product.

EXAMPLE 10

The procedures of Example 1 were repeated except for employing master batch pellets produced using 0.70 weight part of a titanate coupling agent (KRTTS, available from Ajinomoto Fine-Techno, Co., Inc.) in place of stearic acid, to produce test pieces of the propylene resin composition molded product.

EXAMPLE 11

The procedures of Example 1 were repeated except for employing master batch pellets produced using 20 weight part of ethylene-butene elastomer (EBR, MFR determined at 190° C. and 2.16 kg: 5.0 g/10 min.) in place of the SEPS and 0.70 weight part of a titanate coupling agent (KR44) in place of stearic acid, to produce test pieces of the propylene resin composition molded product.

EXAMPLE 12

The procedures of Example 1 were repeated except for employing master batch pellets produced using 20 weight part of ethylene-butene elastomer (EBR, MFR determined at 190° C. and 2.16 kg: 5.0 g/10 min.) in place of the SEPS and 0.70 weight part of a titanate coupling agent (KRTTS) in place of stearic acid, to produce test pieces of the propylene resin composition molded product.

EXAMPLE 13

The procedures of Example 1 were repeated except for employing master batch pellets produced using 20 weight part of ethylene-octene elastomer (EOR, MFR determined at 190° C. and 2.16 kg: 5.0 g/10 min.) in place of the SEPS and 0.70 weight part of a titanate coupling agent (KR44) in place of stearic acid, to produce test pieces of the propylene resin composition molded product.

EXAMPLE 14

The procedures of Example 1 were repeated except for employing master batch pellets produced using 20 weight part of ethylene-octene elastomer (EOR, MFR determined at 190° C. and 2.16 kg: 5.0 g/10 min.) in place of the SEPS and 0.70 weight part of a titanate coupling agent (KRTTS) in place of stearic acid, to produce test pieces of the propylene resin composition molded product.

EXAMPLE 15

The procedures of Example 1 were repeated except for employing a master batch pellets produced using 0.70 weight part of a silane coupling agent (A-1100, available from Momentive Performance Materials Japan LLC) in place of stearic acid, to produce test pieces of the propylene resin composition molded product.

COMPARISON EXAMPLE 1

The procedures of Example 1 were repeated except for employing a master batch pellets produced using the propylene polymer in an amount of 30 weight parts and using neither elastomer nor stearic acid, to produce test pieces of the propylene resin composition molded product.

[Evaluation]

The test pieces produced in Examples 1 to 15 and Comparison Example 1 were subjected to determinations of Izod impact strength, Dupont impact strength (surface impact strength) and modulus in flexure by the below-described methods.

(1) Izod Impact Strength

The Izod impact strength was determined by the method described in ASTM-D256 at −30° C.

(2) Dupont Impact Strength

The Dupont impact strength was determined using a test piece (80 mm×80 mm×3 mm). The test piece was allowed to stand at −30° C. for 5 hours. Subsequently, the test piece was subjected to the determination of a Dupont impact strength by means of a Dupont impact strength-measuring apparatus having a hammer (radius: 6.35±0.03 mm) and a pending weight (6 kg) under the condition of the maximum weight drop height of 90 cm. The measurement was done using five test pieces.

In the measurement, the weight was dropped onto the test piece from increasing heights. When no cracks were observed on every test piece at the highest drop height, the drop height (cm) was checked. The Dupont impact strength (kgf·cm) was then obtained using the formula of the highest drop height (cm)×weight (6 kg) of the dropped weight. If no cracks were observed in test pieces when the weight was dropped onto the test pieces from the maximum height, a Dupont impact strength of the test pieces was more than 540 kgf·cm (>540 kgf·cm).

TABLE 1

|  | Composition of MB pellets | | | | | Izod | Dupont | Modulus |
| --- | --- | --- | --- | --- | --- | --- | --- | --- |
|  | (A) | (B) | (C) | (D) | (E) | (J/m) | (kgf · cm) | (MPa) |
| Example 1 | 10 | 70 | 20 | 1.47 | 0.14 | 85.4 | >540 | 2165 |
| Example 2 | 10 | 70 | 20 | 1.47 | 0.70 | 94.6 | >540 | 2197 |

TABLE 1-continued

| | Composition of MB pellets | | | | | Izod | Dupont | Modulus |
| | (A) | (B) | (C) | (D) | (E) | (J/m) | (kgf·cm) | (MPa) |
|---|---|---|---|---|---|---|---|---|
| Example 3 | 10 | 70 | 20 | 1.47 | 2.10 | 82.5 | >540 | 2255 |
| Example 4 | 10 | 70 | 20 | 1.47 | 0.70 | 84.9 | >540 | 2192 |
| Example 5 | 10 | 70 | 20 | 1.47 | 0.70 | 91.1 | >540 | 2270 |
| Example 6 | 10 | 70 | 20 | 1.47 | 0.07 | 93.3 | >540 | 2129 |
| Example 7 | 10 | 70 | 20 | 1.47 | 0.70 | 94.6 | >540 | 2376 |
| Example 8 | 10 | 70 | 20 | 1.47 | 3.00 | 85.6 | >540 | 2179 |
| Example 9 | 10 | 70 | 20 | 1.47 | 7.00 | 85.0 | >540 | 2186 |
| Example 10 | 10 | 70 | 20 | 1.47 | 0.70 | 84.7 | >540 | 2140 |
| Example 11 | 10 | 70 | 20 | 1.47 | 0.70 | 77.2 | >540 | 2330 |
| Example 12 | 10 | 70 | 20 | 1.47 | 0.70 | 76.5 | >540 | 2284 |
| Example 13 | 10 | 70 | 20 | 1.47 | 0.70 | 78.9 | >540 | 2263 |
| Example 14 | 10 | 70 | 20 | 1.47 | 0.70 | 82.5 | >540 | 2105 |
| Example 15 | 10 | 70 | 20 | 1.47 | 0.70 | 85.4 | >540 | 2165 |
| Com. Ex. 1 | 30 | 70 | 0 | 1.47 | 0 | 68.1 | 300 | 2311 |

Remarks:
MB pellets: Master batch pellets
(A): Propylene polymer
(B): Fibrous basic magnesium sulfate filler
(C): Elastomer
(D): Lubricant
(E): Filler-surface treating agent
Izod: Izod impact strength
Dupont: Dupont impact strength
Modulus: Modulus in flexure As is clear from the experimental data set forth in Table 1, the propylene resin composition molded products produced employing the master batch compositions according to the invention (Examples 1 to 15) show higher impact strengths (Izod impact strength as well as Dupont impact strength (surface impact strength)) at such a low temperature as −30° C., as compared with the propylene resin composition molded products produced employing the master batch compositions containing neither elastomer nor filler-surface treating agent (Comparison Example 1). As for the modulus in flexure showing rigidity of a molded product, the propylene resin composition molded products produced employing the master batch compositions according to the invention (Examples 1 to 15) show satisfactory values from the viewpoint of practical use.

What is claimed is:

1. A process for producing a molded fibrous basic magnesium sulfate filler-containing olefin polymer composition product which comprises the steps of:
    preparing a fibrous basic magnesium sulfate filler-containing master batch composition which comprises the following components:
    (A) an olefin polymer,
    (B) a fibrous basic magnesium sulfate filler,
    (C) an elastomer,
    (D) a lubricant selected from the group consisting of a hydrocarbon, a halogenated hydrocarbon, a fatty acid amide, an alkylene(bisfatty acid amide), a fatty acid ester, a monoalcohol having 16 or more carbon atoms, a polyhydric alcohol, and a fatty acid salt of magnesium or a metal having an ionization tendency lower than that of magnesium, and
    (E) a filler-surface treating agent selected from the group consisting of a fatty acid, an oxyfatty acid, a phosphate of an aliphatic alcohol, and a coupling agent;
    mixing 100 weight parts of the fibrous basic magnesium sulfate-containing master batch composition and 100 to 2,000 weight parts of a diluent resin containing a propylene polymer, to give a mixture;
    kneading the resulting mixture in a molten state, to give a molten mixture; and
    molding the molten mixture to give the molded product.

2. The process of claim 1, wherein the master batch composition comprises the component (A) in an amount of 1 to 45 weight parts, the component (B) in an amount of 35 to 80 weight parts, and the component (C) in an amount of 5 to 45 weight parts under the condition that the total amount of the components (A), (B) and (C) is 100 weight parts, and the component (D) in an amount of 0.01 to 10.0 weight parts and the component (E) in an amount of 0.01 to 15.0 weight parts under the condition that the amount of the component (D) is in the range of 0.02 to 15.0 weight parts and the amount of the component (E) is in the range of 0.02 to 20.0 weight parts, per 100 weight parts of the component (B).

3. The process of claim 1, wherein the component (A) is at least one olefin polymer selected from the group consisting of a propylene polymer, an ethylene polymer, and an ethylene-propylene copolymer.

4. The process of claim 1, wherein the component (B) is a fibrous basic magnesium sulfate filler has a thickness in the range of 0.1 to 1.0 μm and an average aspect ratio of 5 or more.

5. The process of claim 1, wherein the component (C) is at least one elastomer selected from the group consisting of an ethylene-butene elastomer, an ethylene-octene elastomer and a styrenic unit-containing elastomer.

6. A fibrous basic magnesium sulfate filler-containing master batch composition which comprises the following components:
    (A) an olefin polymer,
    (B) a fibrous basic magnesium sulfate filler,
    (C) an elastomer,
    (D) a lubricant selected from the group consisting of a hydrocarbon, a halogenated hydrocarbon, a fatty acid amide, an alkylenebis(fatty acid amide), a fatty acid ester, a monohydric alcohol having 16 or more carbon atoms, a polyhydric alcohol, and a fatty acid salt of magnesium or a metal having an ionization tendency lower than that of magnesium, and
    (E) a filler-surface treating agent selected from the group consisting of a fatty acid, an oxyfatty acid, a phosphate of an aliphatic alcohol, and a coupling agent;
    wherein the batch composition comprises the component (A) in an amount of 1 to 45 weight parts, the component (B) in an amount of 35 to 80 weight parts, and the component (C) in an amount of S to 45 weight parts under the condition that the total amount of the components (A), (B) and (C) is 100 weight parts, and the component (D) in an amount of 0.01 to 10.0 weight parts and the component (E) in an amount of 0.01 to 15.0 weight parts under the condition that the amount of the component (D) is in the range of 0.02 to 15.0 weight parts and the amount of the component (E) is in the range of 0.02 to 20.0 weight parts, per 100 weight parts of the component (B).

7. The fibrous basic magnesium sulfate filler-containing master batch composition of claim 6, wherein the component (A) is at least one olefin polymer selected from the group consisting of a propylene polymer, an ethylene polymer, and an ethylene-propylene copolymer.

8. The fibrous basic magnesium sulfate filler-containing master batch composition of claim 6, wherein the component (B) is a fibrous basic magnesium sulfate has a thickness in the range of 0.1 to 1.0 μm and an average aspect ratio of 5 or more.

9. The fibrous basic magnesium sulfate filler-containing master batch composition of claim 6, wherein the component (C) is at least one elastomer selected from the group consisting of an ethylene-butene elastomer, an ethylene-octene elastomer and a styrenic unit-containing elastomer.

10. The fibrous basic magnesium sulfate filler-containing master batch composition of claim 6, wherein the composition contains the component (D) in an amount of 0.1 to 5.0 weight parts per the total amount of the components (A), (B) and (C) and in an amount of 0.2 to 5.0 weight parts per 100 weight parts of the component (B).

11. The fibrous basic magnesium sulfate filler-containing master batch composition of claim 6, wherein the composition contains the component (E) in an amount of 0.03 to 10.0 weight parts per the total amount of the components (A), (B) and (C) and in an amount of 0.06 to 15.0 weight parts per 100 weight parts of the component (B).

* * * * *